A. LARSON.
SPOON AND FORK COMBINED.
APPLICATION FILED DEC. 30, 1919.

1,351,045.

Patented Aug. 31, 1920.

*INVENTOR:*
Albert Larson
BY HIS ATTORNEY:
A.M. Carlsen.

UNITED STATES PATENT OFFICE.

ALBERT LARSON, OF LUCAN, MINNESOTA.

SPOON AND FORK COMBINED.

1,351,045.  Specification of Letters Patent.  Patented Aug. 31, 1920.

Application filed December 30, 1919. Serial No. 348,431.

*To all whom it may concern:*

Be it known that I, ALBERT LARSON, a citizen of the United States, residing at Lucan, in the county of Redwood and State of Minnesota, have invented a new and useful Spoon and Fork Combined, of which the following is a specification.

My invention relates to basting spoons, and the object is to provide a basting spoon the bowl of which is convertible into fork tines when so desired, and to provide means for spreading and closing said tines more or less or even entirely together, as may be desired for beating eggs, batter, or other substances.

Figure 1:
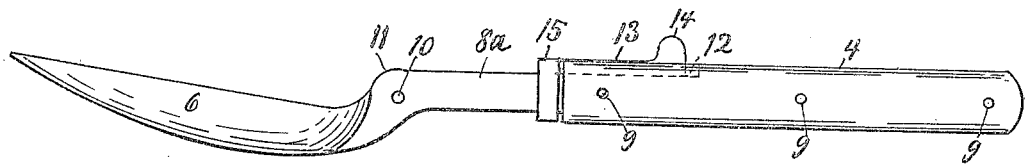
Figure 2:
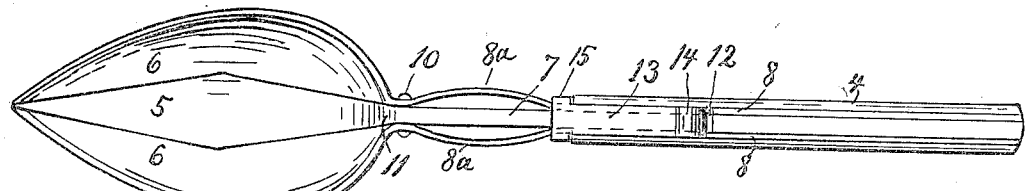
Figure 3:
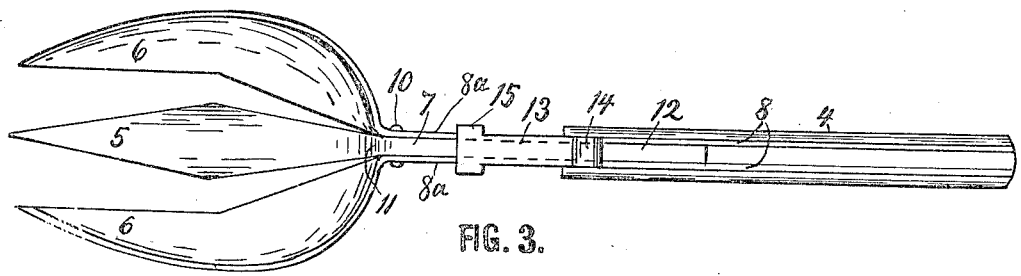

In the accompanying drawing:

Figure 1 is an edge view of my combined spoon and fork. Fig. 2 is a plan view of the device with the parts of the bowl of the spoon in closed position. Fig. 3 is Fig. 2 with the bowl spread into tines.

Referring to the drawing by reference numerals, 4 designates the handle of the device and may be made of either wood or metal or any other suitable material, and the blade parts 5, 6, 6 are of metal and may have their extensions or shanks 7, and 8, 8 secured to the handle in any suitable manner. One of such manners may be to have the shanks extending partly or all the way in between the halves of the handle and rivets 9 put through them and the handle.

The shanks 8 are formed with outwardly bulged springs or resilient portions $8^a$, which are loosely secured to the middle shank 7 by a rivet 10, said shanks being enlarged at 11 to compensate for the weakening caused by the rivet hole.

In a longitudinal recess 12 in the top of the handle is mounted a slide 13 having a thumb-catch 14. The front end of said slide carries a yoke or ring 15, which is slidable on all the shanks, and is of a size adapted to close the bulges $8^a$ to the sides of the shanks 7 and thereby cause the parts 6, 6 of the bowl to spread more or less away from the part 5, and to be held in such position by said ring during the operation of the device either as a basting spoon or as a meat fork. To close the tines more and more together the ring 15 is simply moved toward the handle, so as to permit the springs $8^a$ to arch outward and thereby bring the tines 6, 6 inward. When the tines 6, 6, are fully closed inwardly they form with the tine 5 a water tight bowl which may serve as a dipper for purpose of dividing the substance beaten, as when batter is to be dipped onto a pancake iron.

The contact of the springs $8^a$ with the ring 15 holds the latter in any position desired.

What I claim is:

1. A combined spoon and fork comprising a handle and extending forward from the handle a central or middle tine and two side tines normally closed to the central tine, and means for spreading and holding the side tines more or less spread away from the edges of the central tine, said tines when closed together forming a bowl.

2. The structure specified in claim 1, the central tine having a stiff shank holding it to the handle, and the side tines having outwardly arched resilient shanks connecting them with the handle, a ring or yoke slidable on said shanks and adapted to spring the resilient arches toward the middle shank.

3. The structure specified in claim 2, said handle having in its front portion a groove and said yoke having a slide slidable in said groove and provided with a thumb catch by which to move it.

4. The structure specified in claim 3, said shanks being enlarged near the tines and there loosely connected together by a rivet transversely through them.

5. A basting spoon or other spoon having its bowl divided longitudinally into a rigid middle member and two side members, the latter arranged to spread with their front ends away from the middle member, and means for spreading and holding spread the side members when so desired.

In testimony whereof I affix my signature.

ALBERT LARSON.